L. FABER.
TIRE PROTECTOR.
APPLICATION FILED JULY 19, 1909.
952,073.
Patented Mar. 15, 1910.
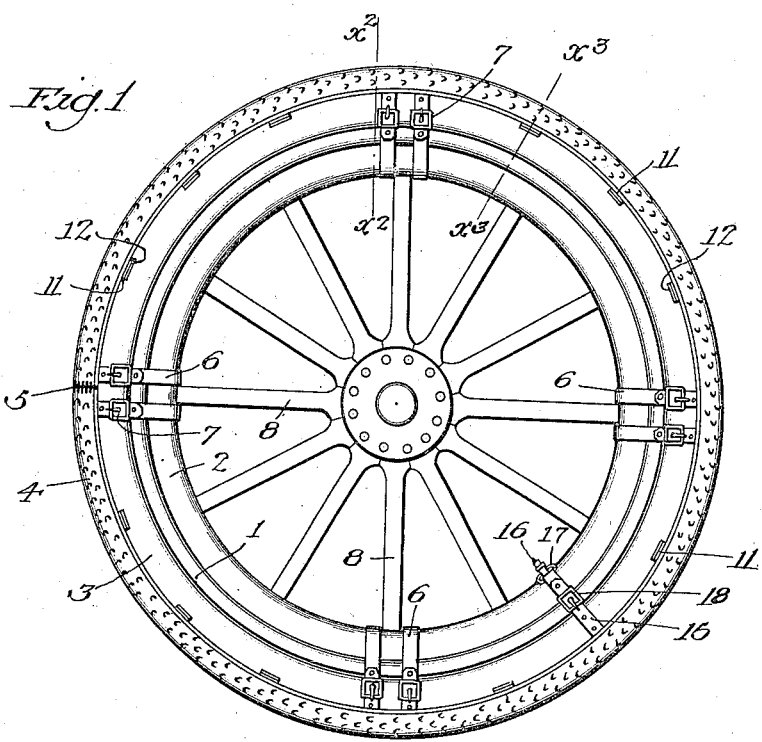
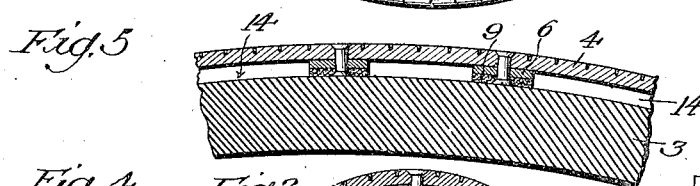
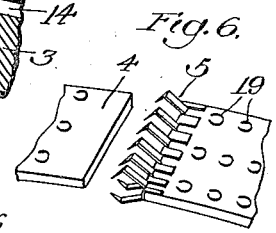
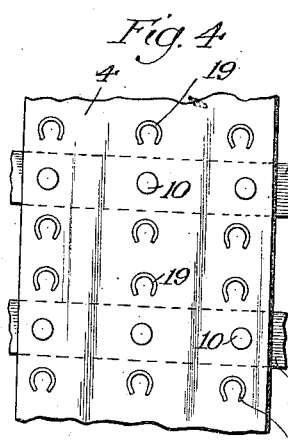
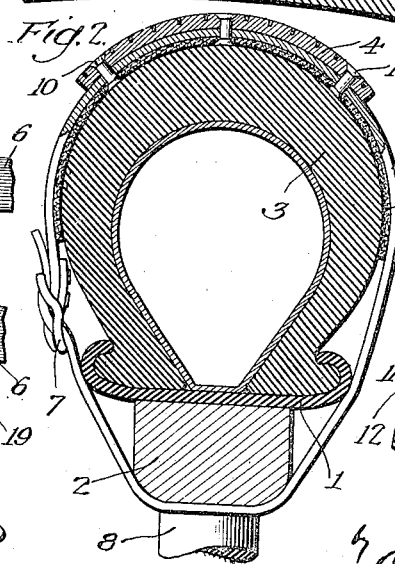
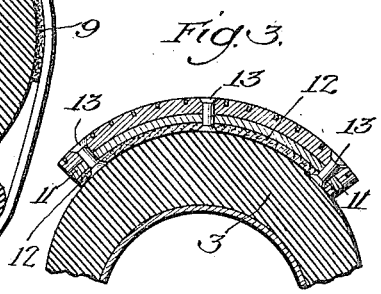
Inventor:
Lina Faber,

UNITED STATES PATENT OFFICE.

LINA FABER, OF SAN BERNARDINO, CALIFORNIA.

TIRE-PROTECTOR.

952,073.

Specification of Letters Patent. Patented Mar. 15, 1910.

Application filed July 19, 1909. Serial No. 508,526.

*To all whom it may concern:*

Be it known that I, LINA FABER, a citizen of the United States, residing at San Bernardino, in the county of San Bernardino and State of California, have invented a new and useful Tire-Protector, of which the following is a specification.

One of the objects of this invention is to provide a tire protector of simple construction that may be easily fitted over the tire, and when so placed forms a protector or shoe for the tread and sides of the tire, preventing puncture and wear of the tire, but in no manner interfering with the resiliency or cushioning qualities of the tire.

Another object of this invention is to construct a tire protector in such a manner that undue heating of the tire, which is ordinarily caused by the frictional contact of the tire with the road, may be overcome and thus lengthen the life of the tire.

Another object of this invention is to produce an article of the class described which may be fitted to various sizes of tires and when so fitted to the tire it will afford a continuous wearing surface of tenacious material of greater durability than the tire itself.

Other advantages of this invention will appear as hereinafter described.

Referring to the drawings:—Figure 1 is a side view of a vehicle wheel and tire fitted with my invention. Fig. 2 is a cross section on the line $x^2$—$x^2$ Fig. 1. Fig. 3 is a cross section on the line $x^3$—$x^3$ Fig. 1. Fig. 4 is a plan view of a portion of the protector. Fig. 5 is a longitudinal sectional view of a portion of the tire with the tire protector thereon. Fig. 6 is a perspective view of the shoe coupling.

1 designates a vehicle wheel having a felly 2 and pneumatic or other resilient tire 3. A shoe 4 preferably of leather fits over the tread of the tire and extends downwardly on each side of the tire a sufficient distance to protect the tire from wear by coming into contact with the roadway and also to cover that part of the tire which is ordinarily exposed to obstacles, such as nails, which might puncture or damage the tire.

In equipping a wheel with the tire protector the shoe is placed over the tire and the two ends of the shoe brought together and marked, when they may be cut to the desired length and fastened together by the coupling as shown at 5. This operation insures a snug fit of the shoe over the tire. The shoe is secured to the wheel by means of straps 6 which pass around the felly 2 and are buckled as shown at 7. The straps are arranged in pairs, the straps of each pair lying closely against opposite sides of the adjacent spoke 8 of the wheel, so that the shoe is held firmly in position against creeping and has no relative movement with respect to the tire but becomes practically a unit therewith. The inner face of each strap is covered with a strip 9 of felt or other similar material, the strips of felt, strap and shoe being securely fastened together by means of rivets 10. These strips of felt act as a cushion between the straps and tire and prevent chafing or abrading of the tire.

At points intermediate of the straps above described, strips or cleats 11 of leather and strips of felt 12, or other padding material, are secured to the shoe 4 by rivets 13, the strips 11 of leather and felt 12 extending only the width of the shoe as shown in Fig. 3. This construction holds the shoe at a distance from the tread of the tire thus forming an insulation or air space 14 between the shoe and tire which allows air to come into contact with the tire and keeps the rubber or material of which it is composed in a comparatively cool condition, which assists the tire to withstand wear. A fastening strap 15 may also be provided at a point where the air valve 16 of the tire is situated and in this case a ring 17 is provided in the strap 15 which encircles the air valve, the free ends of the strap 15 being secured by a buckle 18.

The shoe 4 is preferably made of leather as heretofore described but to increase the wearing quality of the shoe U-shaped wearing plates 19 as shown may be driven into the surface of the shoe.

Felt or other porous cushioning material is used as above described to prevent chafing or abrading of the tire and to permit of a circulation of air between the shoe and the tire, the felt on the inner face of the strips of leather 11 extending the full width of the strip forming a cushion between the strip and tire. The inner face of the straps 6 is covered a distance greater than half of the circumference of the tire so that the 11 strap is prevented from touching the tire even when the tire is in a deflated condition.

What I claim is:—

A tire protector, comprising a shoe adapted to encircle a tire, said shoe having a continuous tread portion, a plurality of strips attached to the inner surface of said shoe to form air spaces between said shoe and tire, said strips having free ends extending laterally from said shoe, means for securing said free ends, a soft padding attached to the underside of said strips, said padding extending a distance greater than half of the circumference of the tire, a plurality of strips attached to the inner surface of said shoe intermediate of said first named strips to form air spaces between said tire and said shoe, a soft padding attached to the inner surface of said latter strips, said padding covering the inner surface of said latter strips forming a cushion between said strips and tire.

In testimony whereof, I have hereunto set my hand at San Bernardino, California, this sixth day of July 1909.

LINA FABER.

In presence of—
 JAMES H. BOYD,
 HOMER R. SCOTT.